March 11, 1969 E. D. DAVIES 3,431,564

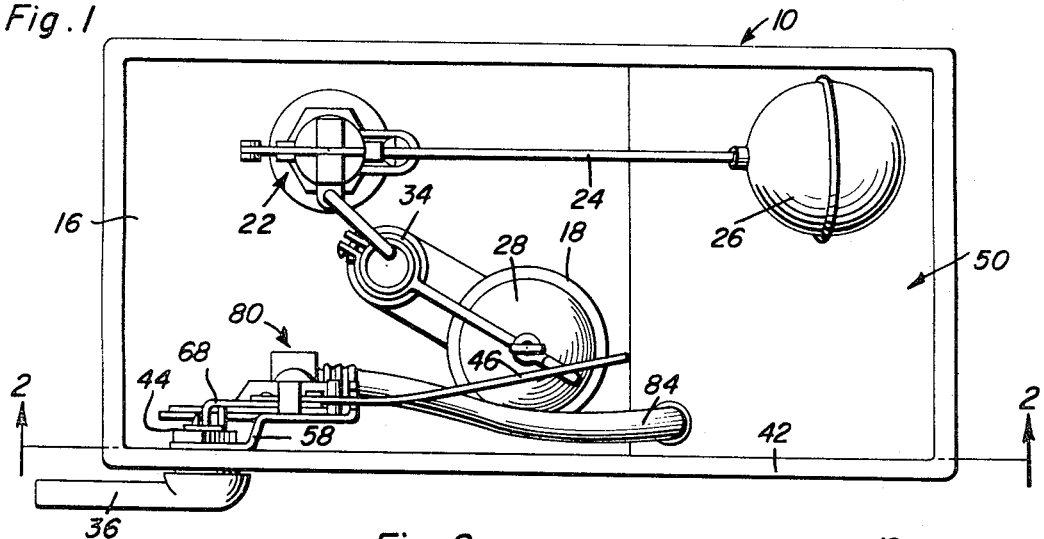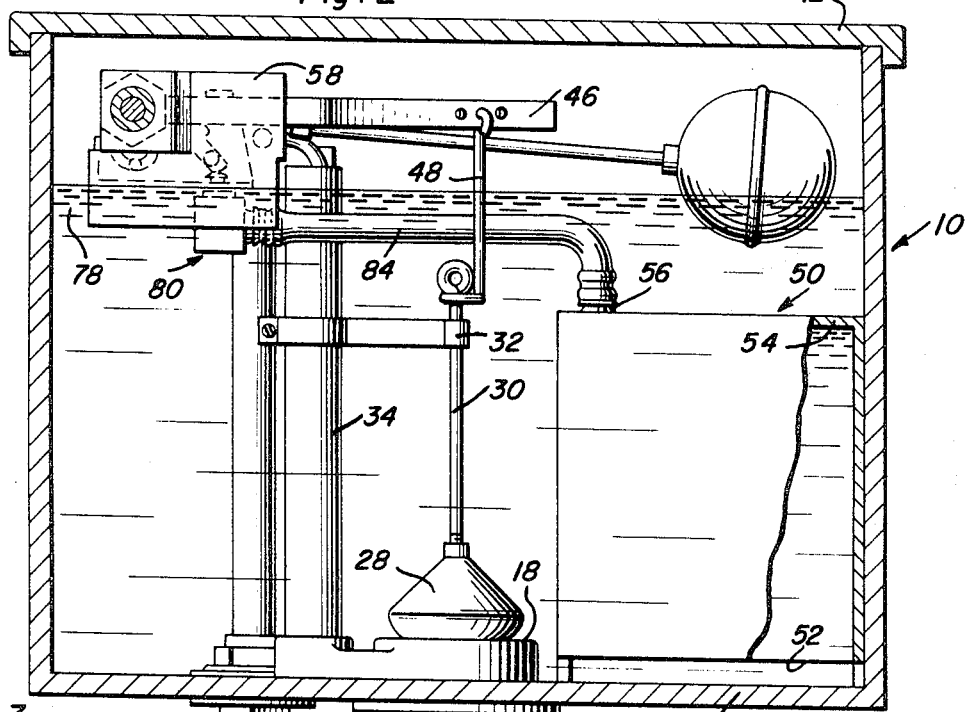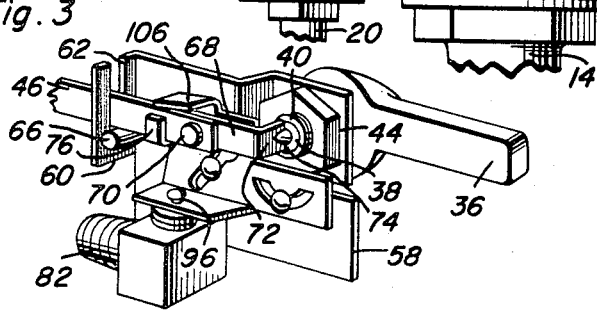

WATER SAVING DEVICE FOR WATER CLOSETS

Filed April 3, 1967 Sheet 2 of 2

Evan D. Davies
INVENTOR.

BY Clarence A. O'Brien
and Harvey B. Jacobson
Attorneys

United States Patent Office 3,431,564
Patented Mar. 11, 1969

3,431,564
WATER SAVING DEVICE FOR
WATER CLOSETS
Evan D. Davies, 8641 SW. 16th Court,
Fort Lauderdale, Fla. 33314
Filed Apr. 3, 1967, Ser. No. 628,103
U.S. Cl. 4—40                    10 Claims
Int. Cl. E03d 1/22, 1/34, 5/02

ABSTRACT OF THE DISCLOSURE

An attachment for a water closet tank consisting of a reserve tank to be disposed in and displace water within the main tank and which has its lower end communicated with the bottom of the main tank below the low water level therein and which is closed at its upper end, the upper end of the reserve tank including vent air passage means with air valve means associated therewith selectively operable by the valve actuator of the main tank in a manner such that water my be discharged from the main tank and retained within the reserve tank or the upper portion of the reserve tank may be vented to the ambient atmosphere upon the opening of the outlet valve of the main tank whereby water from the reserve tank will also flow out of the outlet for the main tank.

---

This invention relates to a reserve tank for disposition in the water tank of a water closet and including valve means for controlling the flow of water from the reserve tank into the main tank and selectively operable upon actuation of the water outlet valve of the main tank.

The attachment includes a modified main tank water outlet valve actuating mechanism which is of the usual type and includes an exterior lever whose free end portion may be depressed to open the water outlet valve of the main tank. However, the modified actuator not only includes a depressed position for opening the main tank water outlet valve but also an elevated position for opening the main tank outlet valve which will also open the valve means controlling the flow of water from the reserve tank into the main tank.

The reserve tank does not include the usual outlet valve in the lower portion thereof but is open to the interior of the main tank in its lower portion only to an elevation below the low water level of the main tank. The reserve tank is closed at its upper end except for a vent air passage opening thereinto and it is the vent air passage that is valved to control the flow of water out of the reserve tank. In this manner, when the vent air passage is closed, the reserve of water therein is prevented from flowing out of the lower end of the reserve tank by the vacuum formed in the upper portion of the reserve tank as the water level in the main tank drops below the upper end of the reserve tank. However, if the vent passage valve is open, the formation of a vacuum within the upper portion of the reserve tank is prevented and thus the water within the reserve tank flows outwardly therefrom as the water level in the main tank drops upon its outlet valve being opened.

The main objective of this invention is to provide a water saving device for water closets that may be utilized to maintain a predetermined quantity of water within the water tank of a water closet whenever desired.

Another object of this invention is to provide a water saving device which may be selectively rendered inoperative so as to discharge substantially all of the water within the main tank and the reserve tank from the water closet tank whenever desired.

Another very important object of this invention is to provide an assemblage in accordance with the immediately preceding objects and including an actuator therefor whose operation is, in part, identical to conventional water tank actuators whereby a person unfamiliar with the operation of the improvement of the instant invention may actuate the associated water closet in the conventional manner and need not be "briefed" as to any different mode of operation of the actuator for the water closet tank outlet valve.

It is an object, in accordance with the immediately preceding object, to provide an actuator for the instant invention which will, upon normal mode of actuation, discharge not only the water within the water closet tank but also the water within the reserve tank, thereby assuring that a person unfamiliar with the manner of improved operation of the instant invention will automatically be assured of discharging the maximum amount of water from the water closet.

It is still another object of this invention, however, to provide an actuator for the improved water closet which may be actuated, whenever desired, by persons familiar with the mode of operation of the improvement of the instant invention to discharge only that water within the main water tank disposed exteriorly of the reserve tank whereby considerable savings in water may be obtained. In this manner, all persons using the associated water closet may be briefed on the "special" operation of the instant invention and make use of its water saving operation whenever possible while persons unfamiliar with this "special" operation will automatically operate the actuator portion of the associated water closet in the conventional manner thus discharging all of the water from within the main water tank including the reserve supply of water within the reserve tank.

A final object of this invention is to provide a water saving device for water closets which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a conventional form of water closet water tank with the top thereof removed and with the water saving device of the instant invention operatively associated therewith;

FIGURE 2 is a sectional view taken substantially upon the plane indicated by the section line 2—2 of FIGURE 1 and with the top of the tank of the water closet in position over the open upper end of the tank;

Figure 4:
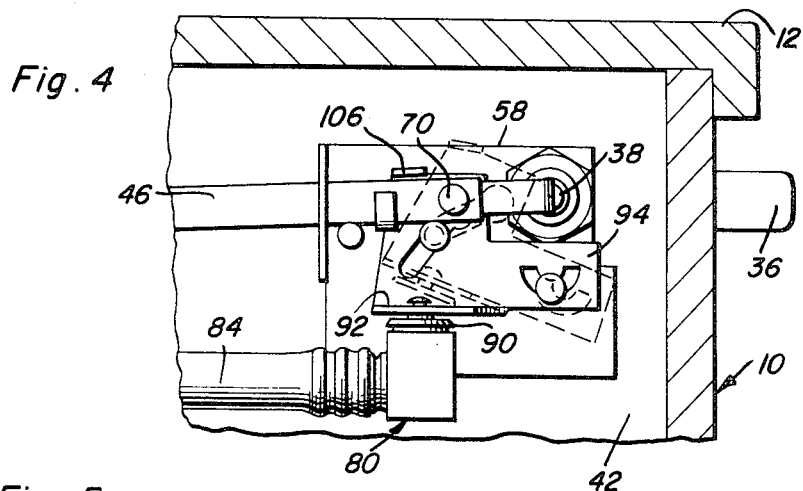
Figure 5:
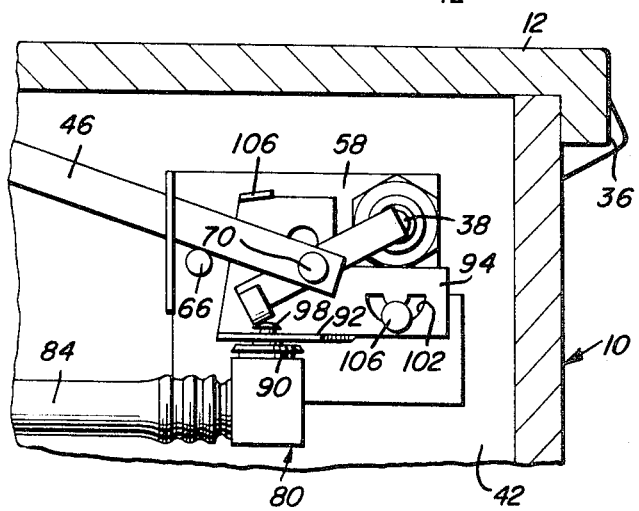
Figure 6:
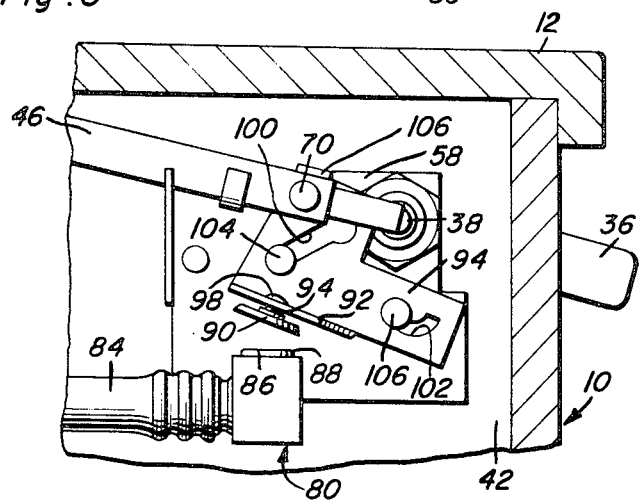

FIGURE 3 is a perspective view of the valve actuator control portion of the instant invention; and FIGURES 4–6 are fragmentary vertical sectional views taken upon planes passing longitudinally through the center of the water tank and illustrating the assemblage of FIGURE 3 mounted on the inside of the front wall of the tank and with the component parts thereof illustrated in FIGURE 4 of the drawings in nonactive positions and in FIGURES 5 and 6 of the drawings in alternate active positions.

Referring now more specifically to the drawings the numeral 10 generally designates a water closet tank including a removable top 12 and a water outlet pipe 14 opening upwardly through its bottom wall 16 and provided with a valve seat structure 18 disposed above the bottom wall 16. The tank 10 includes a water inlet pipe 20 which extends upwardly through the bottom wall 16 and is provided with a valve assembly generally referred to by the reference numeral 22 on its upper end controlled by a pivoted float arm 24 having a float 26 on its free end.

A vertically reciprocal valve member 28 is provided for vertical up-and-down movement toward and away from the valve seat structure 18 and includes an upwardly projecting stem portion 30 which is slidably received through a tubular guide portion 32 supported from an overflow pipe structure 34. Further, an actuator lever 36 is mounted on a shaft portion 38 journaled through a tubular and shouldered fitting 40 secured through the front wall 42 of the tank 10 by means of a threaded fastener 44 and the upper end of the stem or stem portion 30 is connected to the free end of a lifting lever 46 by means of a link 48 having a one-way lost motion connection with the stem or stem portion 30.

The preceding description of the water tank 10 and the various components therein may be considered as conventional except for the lifting lever or arm 46 which serves, in addition to its usual function, other functions to be hereinafter more fully set forth.

The improvement of the instant invention includes the provision of a reserve water tank 50 which is closed at its top and is open at its bottom as at 52 to an elevation spaced slightly below the upper extremities of the valve seat structure 18 and therefore below the minimum water level within the tank 10. The top wall 54 of the tank 50 has an air vent passage forming fitting 56 secured therethrough, any suitable neck portion formed as an integral portion of the top wall 54 being a proper substitute for the fitting 56.

The instant invention further includes a generally plate-like mounting bracket 58 through which the aforementioned shouldered fitting 40 is secured and which is therefore supported from the inner surface of the front wall 42 by means of the fitting 40. The mounting bracket 58 includes a right angled flange portion 60 provided with a vertical guide slot 62 in which the end of the lifting lever 46 remote from the link 48 is slidable and an adjacent portion of the mounting bracket 50 includes an outstanding stop lug or pin 66 upon which the adjacent end of the lifting lever 46 may rest.

The terminal end portion of the lifting lever 46 remote from the link 48 is pivotally secured to a second short lever 68 centrally intermediate its opposite ends by means of a pivot pin 70. One end of the short lever 68 is provided with a right angulated flange portion 72 whose free terminal end is keyed in a diametric slot 74 formed in the shaft portion 38 and the remote end of the short link 68 is provided with an outstanding L-shaped portion 76 defining a lifting saddle for the lifting lever 46 a spaced distance longitudinally of the latter from the pivot pin or fastener 70.

With attention now invited more specifically to FIGURES 4–6 of the drawings it may be seen that when the free end of the actuator lever 36 is horizontally disposed the short lever 68 and the lifting lever 46 are longitudinally aligned and substantially horizontally disposed. In this position of the lifting lever 46 the stem 30 is allowed to fall to its lowermost position illustrated in FIGURE 2 of the drawings with the valve member 28 closing the valve seat structure 18 and thus preventing the flow of water from the tank 10 outwardly through the outlet pipe 14. However, when the free end of the actuator lever 36 is depressed downwardly in the conventional manner illustrated in FIGURE 6 of the drawings angular displacement of the shaft portion 38 causes the short lever 68 to swing in a counterclockwise direction as viewed in FIGURE 6 of the drawings about the longitudinal axis of the shaft portion 38 and the lifting saddle 76 to lift up on the end of the lifting lever 46 adjacent the pivot fastener 70 in a manner swinging the lifting lever 46 with the short lever 68 and thus elevating the free end of the lifting lever 46 which includes a lost motion connection with the stem 30 through the link 48. Thus, movement of the actuator lever 36 to the position thereof illustrated in FIGURE 6 will cause the link 48 to lift up on the upper end of the stem 30 and thus elevate the valve member 28 from engagement with the valve seat structure 18 whereupon the air trapped within the valve member 28 will cause the latter to float upwardly in the tank 10 as the water 78 flows outwardly of the outlet pipe 14. Of course, as the water level within the tank 10 drops, the valve member 28 will again be lowered into sealed engagement with the valve seat structure 18 in the conventional manner.

With attention now invited more specifically to FIGURE 5 of the drawings, it may be seen that when the free end of the actuator lever 36 is swung upwardly the pivot pin or fastener 70 pushes down on the adjacent terminal end of the lifting lever 46 and the latter fulcrums about the stop lug or pin 66 so as to raise the end thereof to which the link 48 is attached. Of course, inasmuch as both up and downward movements of the actuator lever 36 from the position thereof illustrated in FIGURE 4 of the drawings to the positions thereof illustrated in FIGURES 5 and 6 of the drawings causes the free end of the lifting lever 46 to be raised, the valve member 28 may be lifted from the valve seat structure 18 in order to discharge the water 78 from the tank 10 either by lifting up on the lever 36 in the manner illustrated in FIGURE 5 of the drawings or pushing down on the lever 36 in the manner illustrated in FIGURE 6 of the drawings.

With continued reference now to FIGURES 3–6 and also to FIGURE 2 it may be seen that an air valve assembly generally referred to by the reference numeral 80 is also supported from the mounting plate 58. The assembly 80 includes an outlet neck portion 82 and an air conduit 84 extends between the outlet neck 82 and the fitting 56 on the reserve water tank 50. The air valve assembly 80 includes an air inlet opening 86 defined by an annular resilient seal 88 secured in the end of an air inlet passage (not shown) opening into the air valve assembly 80 and a valve member disk 90 is loosely supported from a horizontal flange portion 92 projecting outwardly of the lower end of an actuator plate 94. The valve member disk 90 includes a stem portion 94 which is loosely received through an opening 96 formed in the horizontal flange portion 92 and which includes an enlarged head 98 on its end passed through the opening 96.

The actuator plate 94 includes a first diagonal slot 100 and a second arcuate slot 102 while the mounting plate 58 includes first and second headed pins 104 and 106 slidably received through the slots 100 and 102. The plate 94 is thus supported from the mounting plate 58 and shiftable between the positions illustrated in FIGURES 5 and 6 of the drawings. The upper portion of the plate 94 includes an outwardly projecting stop flange 106 and it may be seen from FIGURE 6 of the drawings that the end of the lifting lever 46 adjacent the pivot pin 70 is engageable with the stop flange 106 and that the end of the short link 68 remote from the shank portion or shaft portion 38 is engageable with the head 98, see FIGURE 5.

In operation, when the free end of the actuator lever 36 is raised as illustrated in FIGURE 5 of the drawings and the valve member 28 is therefore raised from engagement with the seat structure 18, all of the water within the tank 10 and disposed on the exterior of the reserve water tank 50 will pass outwardly of the valve seat structure 18 in the conventional manner. Of course, inasmuch as the valve seat structure 18 projects slightly upwardly above the bottom wall 16, a certain amount of water disposed below the uppermost portion of the valve seat structure 18 will be retained within the tank 10, and also the water disposed within the reserve water tank 50 will also be maintained in the tank 10 inasmuch as the lower end of the reserve water tank 50 opens into the tank 10 at a level below the low level of water within the tank 10 and the upper portion of the reserve water tank 50 is closed.

However, if the actuating or actuator lever 36 is pushed downwardly in the manner illustrated in FIGURE 6 of the drawings, in addition to the valve member 28 being raised in the conventional manner to discharge water from within the tank 10, the end of the short lever remote from the shank portion 38 and the adjacent end of the lifting lever 46 will engage the stop flange 106 and thus tilt the plate 94 from the position thereof illustrated in FIGURE 5 of the drawings to the position thereof illustrated in FIGURE 6 of the drawings thereby raising the valve member disk 90 from engagement with the annular ring seal 88. This of course will vent the upper portion of the reserve water tank 50 to the ambient atmosphere and thereby allow the water within the reserve water tank 50 to also be discharged from the tank 10 by its movement from within the reserve water tank 50, into the lower portion of the tank 10 and then outwardly through the valve seat structure 18. Therefore, it may be seen that downward movement of the free end of the actuating lever 36 will cause all of the water within the tank 10 to be discharged therefrom in the conventional manner. Thus, persons unaccustomed to and unaware of the improvement of the instant invention operatively associated with the tank 10 will automatically actuate the controls for the tank 10 in the usual manner, by depressing the free end of the actuator lever 36, to discharge all of the water from within the tank 10. However, should persons familiar with the operation and function of the instant invention wish to discharge only smaller quantities of water, the free end of the actuating lever 36 may be raised in the manner illustrated in FIGURE 5 of the drawings to discharge from the tank 10 only that water disposed therein outwardly of the reserve water tank 50. Of course, once the valve member disk 90 has been raised in the manner illustrated in FIGURE 6 of the drawings return of the actuator lever 36 to the position thereof illustrated in FIGURE 4 of the drawings will merely allow the valve member 28 to be lowered toward its closed position in the conventional manner and will not shift the plate 94 from the position thereof illustrated in FIGURE 6 of the drawings. Thereafter, continued operation of the actuator lever 36 by pushing down on the free end thereof will result in all of the water within the reserve water tank 50 and the tank 10 being discharged therefrom. Of course, as the water 78 is replenished within the tank 10, if the reserve water tank 50 has had the water discharged therefrom and the valve member disk 90 is open, as the water level rises within the water tank 10 the water level will also rise within the tank 50. Thereafter, should the free end of the actuator lever 36 be swung upwardly in the manner illustrated in FIGURE 4 of the drawings, the end of the short lever 68 remote from the shank portion 38 will push downwardly on the head 98 and shift the plate 94 from the position thereof illustrated in FIGURE 6 of the drawings to the position thereof illustrated in FIGURE 5 of the drawings thereby closing the valve member disk 90 at the same time the valve member 28 is raised so as to maintain the water within the reserve tank 50 entrapped therein until the next time the actuator lever 36 is swung downwardly at its free end in the manner illustrated in FIGURE 6 of the drawings. Accordingly, it may be seen that it is an important feature of this invention for the plate 94 to be maintained in the position thereof illustrated in FIGURE 6 of the drawings after the actuator lever 36 has been urged downwardly and allowed to return to its horizontally disposed position illustrated in FIGURE 4 of the drawings which allows the reserve water tank 50 to also be filled as the level of the water 78 rises in the tank 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a main water tank having a water outlet opening into a lower portion thereof at a level above the lowest portion of the interior of said tank and a water valve mechanism operable to open and close said outlet and including a remotely positioned actuator operatively connected to said valve mechanism for actuation thereof and shiftable between a first position with said valve mechanism closed as well as two different positions with said valve mechanism open, a reserve water tank operatively associated with said main tank and including a closed upper end and an outlet in its lower portion opening into said main tank below said level, a vent air passage opening into the closed upper portion of said reserve tank and having an air valve operatively associated therewith for venting the upper portion of said reserve tank to the ambient area outside said reserve tank, said water valve mechanism actuator including an operative connection with said air valve operable to open the latter upon movement of said actuator to one of said two different positions and inoperative to open said air valve upon movement of said actuator to the other of said two different positions.

2. The combination of claim 1 wherein said reserve tank is disposed in said main tank.

3. The combination of claim 2 wherein said reserve tank is removably supported from the adjacent portion of the bottom of said main tank.

4. The combination of claim 1 wherein said main tank comprises the water supply tank operatively connected to an associated toilet bowl.

5. In combination with a toilet bowl main water supply tank including a valved outlet operatively associated with a toilet bowl and including an oscillatable actuator for said valved outlet shiftable between a normal rest position to which it is yieldingly urged and first and second active positions disposed on opposite sides of said rest position for opening said valved outlet, a reserve water tank including an outlet for discharging water therefrom into said main tank for subsequent discharge therefrom and a control valve assembly operative to selectively control the dicharge of water from said reserve tank into said main tank, said actuator being operatively associated with said control valve assembly for actuation of the latter to effect discharge of water from said reserve tank into said main tank only upon movement of said actuator to one of said active positions thereof.

6. The combination of claim 5 wherein said actuator is of a conventional type with which a large percentage of persons are acquainted and conventionally moved from said rest position to said one active position thereof to effect discharge of water from said main tank into said bowl.

7. The combination of claim 6 wherein said reserve tank is disopsed in and displaces at least some of the water within said main tank.

8. The combination of claim 1 wherein said water valve actuator includes an operative association with said air valve for closing the same only in response to movement of said actuator to said other operative position.

9. The combination of claim 1 wherein said air valve includes means tending to maintain said air valve in its open position as well as its closed position when said air valve is disposed in said open and closed positions, respectively.

10. The combination of claim 9 wherein said water valve actuator includes an operative association with said air valve for closing the same only in response to movement of said actuator to said other opeartive position.

References Cited

UNITED STATES PATENTS

| 346,261 | 7/1886 | Boyle | 4—40 |
| 354,133 | 12/1886 | Hammann | 4—40 |
| 413,586 | 10/1889 | Wellington | 4—40 |
| 520,358 | 5/1894 | Howell | 4—40 |
| 3,344,439 | 10/1967 | Davies | 4—40 |

LAVERNE D. GEIGER, *Primary Examiner.*

H. K. ARTIS, *Assistant Examiner.*

U.S. Cl. X.R.

4—67